United States Patent
Takeyama

(10) Patent No.: US 10,982,083 B2
(45) Date of Patent: Apr. 20, 2021

(54) FLUORINATED ELASTOMER COMPOSITION AND SHAPED ARTICLE

(71) Applicant: ZEON CORPORATION, Tokyo (JP)

(72) Inventor: Yoshihisa Takeyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 91 days.

(21) Appl. No.: 16/088,729

(22) PCT Filed: Apr. 5, 2017

(86) PCT No.: PCT/JP2017/014286
§ 371 (c)(1),
(2) Date: Sep. 26, 2018

(87) PCT Pub. No.: WO2017/175807
PCT Pub. Date: Oct. 12, 2017

(65) Prior Publication Data
US 2019/0112465 A1    Apr. 18, 2019

(30) Foreign Application Priority Data

Apr. 7, 2016 (JP) .............................. JP2016-077622

(51) Int. Cl.
| C08L 27/12 | (2006.01) |
| C08K 3/04 | (2006.01) |
| C09K 3/10 | (2006.01) |
| C08K 5/00 | (2006.01) |
| C08K 7/04 | (2006.01) |

(52) U.S. Cl.
CPC ............... *C08L 27/12* (2013.01); *C08K 3/04* (2013.01); *C08K 3/041* (2017.05); *C08K 5/0025* (2013.01); *C08K 7/04* (2013.01); *C09K 3/10* (2013.01); *C08K 2201/003* (2013.01); *C08K 2201/011* (2013.01); *C08L 2207/04* (2013.01); *C08L 2312/00* (2013.01)

(58) Field of Classification Search
CPC ................................ C08K 3/041; C08L 27/12
See application file for complete search history.

(56) References Cited

U.S. PATENT DOCUMENTS

| 7,854,991 B2* | 12/2010 | Hata ................. C01B 32/17 428/408 |
| 10,283,231 B2* | 5/2019 | Nagamune .............. C08K 3/04 |
| 2008/0318049 A1 | 12/2008 | Hata et al. |
| 2015/0123043 A1 | 5/2015 | Nagamune et al. |
| 2015/0329705 A1 | 11/2015 | Ueki et al. |
| 2016/0032075 A1 | 2/2016 | Seibold et al. |

FOREIGN PATENT DOCUMENTS

| CN | 104302707 A |   | 1/2015 |   |
| CN | 104327429 A | * | 2/2015 |   |
| CN | 105086300 A |   | 11/2015 |   |
| JP | 4621896 B2 | * | 1/2011 | ............ C01B 32/17 |
| WO | 2006011655 A1 |   | 2/2006 |   |
| WO | 2011077597 A1 |   | 6/2011 |   |
| WO | 2013172334 A1 |   | 11/2013 |   |
| WO | 2014088005 A1 |   | 6/2014 |   |

OTHER PUBLICATIONS

Machine translation of JP 46-21896 B1, published Jan. 26, 2011. (Year: 2011).*
Machine translation of CN 104327429 A, published Feb. 4, 2015 << retrieved from internet on Aug. 11, 2020 >>.*
Jan. 14, 2020, the Extended European Search Report issued by the European Patent Office in the corresponding European Patent Application No. 17779185.2.
Jun. 6, 2017, International Search Report issued in the International Patent Application No. PCT/JP2017/014286.
Oct. 9, 2018, International Preliminary Report on Patentability issued in the International Patent Application No. PCT/JP2017/014286.
Oct. 5, 2020, Communication pursuant to Article 94(3) EPC issued by the European Patent Office in the corresponding European Patent Application No. 17779185.2.
Seisuke Ata et al., Scalable, solvent-less de-bundling of single-wall carbon nanotube into elastomers for high conductive functionality, Polymer, 2014, vol. 55, pp. 5276 to 5283.

* cited by examiner

*Primary Examiner* — Vickey Nerangis
(74) *Attorney, Agent, or Firm* — Kenja IP Law PC

(57) ABSTRACT

Disclosed is a fluorinated elastomer composition which comprises a fluorinated elastomer and fibrous carbon nanostructures, wherein the fibrous carbon nanostructures include single-walled carbon nanotubes, and the fibrous carbon nanostructures are contained in an amount of 0.1 parts by mass or more and less than 5.0 parts by mass per 100 parts by mass of the fluorinated elastomer. Also disclosed is a shaped article formed using the fluorinated elastomer composition.

6 Claims, No Drawings

FLUORINATED ELASTOMER COMPOSITION AND SHAPED ARTICLE

TECHNICAL FIELD

The present disclosure relates to fluorinated elastomer compositions and shaped articles.

BACKGROUND

Shaped articles such as sealing members including packings, gaskets, O-rings, etc. have heretofore been used as members for preventing leakage of, for example, liquids such as oil, water and solvent. Sealing members used in environments which may experience high temperatures, such as those used in deep mining equipment for mining underground resources such as petroleum or natural gas and around shafts of rotating, reciprocating or swinging devices in various types of machines and vehicles, are required to have superior physical properties and abrasion resistance at high temperatures.

To meet this demand, PTL 1, for example, proposes a technique for obtaining a sealing member which has superior physical properties and abrasion resistance at high temperatures, wherein the sealing member is formed by cross-linking an elastomer composition obtained by blending a specific amount of multi-walled carbon nanotubes (hereinafter also referred to as "MWCNTs") having a specific average diameter with a tetrafluoropropylene-propylene copolymer.

CITATION LIST

Patent Literature

PTL 1: WO2011/077597A

SUMMARY

Technical Problem

However, the conventional sealing member described above which comprises multi-walled carbon nanotubes had the problem of becoming too hard when a more amount of multi-walled carbon nanotubes is used to compensate for its insufficient tear strength and tensile energy to break at high temperatures.

An object of the present disclosure is therefore to provide a fluorinated elastomer composition which can be used to form a shaped article such as a sealing member which shows both sufficiently increased flexibility and sufficiently increased high-temperature tensile energy to break and high-temperature tear strength.

Another object of the present disclosure is to provide a shaped article which shows both sufficiently increased flexibility and sufficiently increased high-temperature tensile energy to break and high-temperature tear strength.

Solution to Problem

The inventor conducted extensive studies to achieve the foregoing objects and discovered that when a shaped article such as a sealing member is formed using a composition which comprises a fluorinated elastomer and a specific proportion of fibrous carbon nanostructures including single-walled carbon nanotubes with respect to the fluorinated elastomer, it is possible to sufficiently increase both flexibility and high-temperature tensile energy to break and high-temperature tear strength. The inventor thus completed the present disclosure.

Specifically, the present disclosure aims to advantageously solve the foregoing problem and the fluorinated elastomer composition of the present disclosure comprises a fluorinated elastomer and fibrous carbon nanostructures, wherein the fibrous carbon nanostructures include single-walled carbon nanotubes, and the fibrous carbon nanostructures are contained in an amount of 0.1 parts by mass or more and less than 5.0 parts by mass per 100 parts by mass of the fluorinated elastomer. When a specific proportion of the fibrous carbon nanostructures including single-walled carbon nanotubes is included, it is possible to provide a fluorinated elastomer composition which can be used to form a shaped article which shows both sufficiently increased flexibility and sufficiently increased high-temperature tensile energy to break and high-temperature tear strength.

In the fluorinated elastomer composition of the present disclosure, it is preferred that the fibrous carbon nanostructures exhibit a convex upward shape in a t-plot obtained from an adsorption isotherm. This is because the use of fibrous carbon nanostructures exhibiting a convex upward shape in a t-plot obtained from an adsorption isotherm can further increase flexibility.

It is preferred that the t-plot has a bending point in a range of $0.2 \leq t$ (nm)$\leq 1.5$. This is because the use of fibrous carbon nanostructures whose t-plot has a bending point in a range of $0.2 \leq t$ (nm)$\leq 1.5$ can further increase both flexibility and tear strength at normal and high temperatures.

It is preferred that total specific surface area S1 and internal specific surface area S2, obtained from the t-plot, satisfy the condition $0.05 \leq S2/S1 \leq 0.30$. This is because the use of fibrous carbon nanostructures whose total specific surface area S1 and internal specific surface area S2 satisfy the condition $0.05 \leq S2/S1 \leq 0.30$ can further increase both flexibility and high-temperature tensile energy to break and high-temperature tear strength.

In the fluorinated elastomer composition of the present disclosure, it is preferred that the fibrous carbon nanostructures have an average diameter of 2 nm or more and 10 nm or less. This is because the use of fibrous carbon nanostructures having an average diameter of 2 nm or more and 10 nm or less can further increase both flexibility and high-temperature tensile energy to break and high-temperature tear strength.

It is preferred that the fluorinated elastomer composition of the present disclosure further comprises a cross-linking agent.

The fluorinated elastomer composition of the present disclosure can further comprise a carbon black. Further inclusion of a carbon black makes it possible to increase both flexibility and high-temperature tensile energy to break and high-temperature tear strength in a particularly well-balanced manner.

The present disclosure aims to advantageously solve the foregoing problem and the shaped article of the present disclosure is formed using any of the fluorinated elastomer compositions described above. A shaped article formed using any of the fluorinated elastomer compositions described above shows both increased flexibility and increased high-temperature tensile energy to break and high-temperature tear strength.

Advantageous Effect

According to the present disclosure, it is possible to provide a fluorinated elastomer composition which can be used to form a shaped article which shows both increased flexibility and increased high-temperature tensile energy to break and high-temperature tear strength.

According to the present disclosure, it is also possible to provide a shaped article which shows both increased flexibility and increased high-temperature tensile energy to break and high-temperature tear strength.

DETAILED DESCRIPTION

Embodiments of the present disclosure will be described in detail below.

Fluorinated elastomer compositions according to the present disclosure are used for forming shaped articles such as sealing members, including packings, gaskets, O-rings, etc. Sealing members according to the present disclosure can be formed using the fluorinated elastomer compositions according to the present disclosure and can be used as members for preventing leakage of fluids including liquids such as oil, water and solvent and gases in deep mining equipment for mining underground resources such as petroleum or natural gas and around shafts of rotating, reciprocating or swinging devices in various types of machines and vehicles.

(Fluorinated Elastomer Composition)

The fluorinated elastomer composition of the present disclosure comprises a fluorinated elastomer and fibrous carbon nanostructures, and optionally further comprises additives such as cross-linking agents, reinforcing materials and/or antioxidants. In the fluorinated elastomer composition of the present disclosure, fibrous carbon nanostructures including single-walled carbon nanotubes are used as the fibrous carbon nanostructures.

<Fluorinated Elastomer>

Any fluorinated elastomer can be used in the fluorinated elastomer composition and fluororubbers known in the art used for forming a shaped article can be used. Specific examples of fluorinated elastomers include vinylidene fluoride rubber (FKM), tetrafluoroethylene-propylene rubber (FEPM), tetrafluoroethylene-perfluoromethyl vinyl ether rubber (FFKM), and tetrafluoroethylene rubber (TFE). These fluorinated elastomers can be used alone or in combination of two or more.

Preferred are vinylidene fluoride rubber (FKM) and tetrafluoroethylene-propylene rubber (FEPM), with tetrafluoroethylene-propylene rubber (FEPM) being more preferred.

Vinylidene fluoride rubber (FKM) is a fluororubber which contains vinylidene fluoride as a main component and shows superior characteristics such as heat resistance, oil resistance, chemical resistance, solvent resistance, and workability. Examples of FKM include, but not particularly limited to, copolymers of vinylidene fluoride and hexafluoropyrene, terpolymers of vinylidene fluoride, hexafluoropyrene and tetrafluoroethylene, and quaterpolymers of vinylidene fluoride, hexafluoropyrene, tetrafluoroethylene and a vulcanization site monomer. Commercially available products of FKM include "Viton®" (Viton is a registered trademark in Japan, other countries, or both) manufactured by DuPont Elastomer Co., Ltd., and "DAI-EL® G" (DAI-EL is a registered trademark in Japan, other countries, or both) manufactured by Daikin Industries, Ltd. Preferred are quaterpolymers of vinylidene fluoride, hexafluoropyrene, tetrafluoroethylene and a vulcanization site monomer. The quaterpolymers are commercially available under the trade name "Viton GBL-200S" manufactured by DuPont Elastomer Co., Ltd., for example.

Tetrafluoroethylene-propylene rubber (FEPM) is a fluororubber which is based on an alternating copolymer of tetrafluoroethylene (TFE) and propylene (P) and shows superior characteristics such as heat resistance, chemical resistance, polar solvent resistance, and steam resistance. Examples of FEPM include, but not particularly limited to, copolymers of tetrafluoroethylene (TFE) and propylene (P), terpolymers of tetrafluoroethylene (TFE), propylene (P) and vinylidene fluoride (VdF), and terpolymers of tetrafluoroethylene (TFE), propylene (P) and a cure site monomer (CSM). Commercially available products of copolymers of tetrafluoroethylene (TFE) and propylene (P) include "AFLAS® 100" (AFLAS is a registered trademark in Japan, other countries, or both) and "AFLAS 150" manufactured by Asahi Glass Co., Ltd. Commercially available products of terpolymers of tetrafluoroethylene (TFE), propylene (P) and vinylidene fluoride (VdF) include "AFLAS 200" manufactured by Asahi Glass Co., Ltd. Commercially available products of terpolymers of tetrafluoroethylene (TFE), propylene (P) and a cure site monomer (CSM) include "AFLAS 300" manufactured by Asahi Glass Co., Ltd.

<Fibrous Carbon Nanostructures>

Examples of fibrous carbon nanostructures include cylindrical carbon nanostructures such as carbon nanotubes (CNTs) and non-cylindrical carbon nanostructures such as those formed of a network of 6-membered carbon rings in flattened cylindrical shape. In the fluorinated elastomer composition of the present disclosure, fibrous carbon nanostructures including single-walled CNTs are used. With the use of fibrous carbon nanostructures including single-walled CNTs, it is possible to form a shaped article such as a sealing member which shows both sufficiently increased flexibility and sufficiently increased tear strength at normal and high temperatures.

While the reason is unclear as to why the use of fibrous carbon nanostructures including single-walled CNTs can provide a shaped article which shows both sufficiently increased flexibility and sufficiently increased high-temperature tensile energy to break and high-temperature tear strength, a possible mechanism is presumed to be as follows: Firstly, because single-walled CNTs have a higher reinforcing effect than multi-walled CNTs, it is presumed that a shaped article formed using single-walled CNTs can sufficiently increase high-temperature tensile energy to break and high-temperature tear strength with a smaller amount than multi-walled CNTs. Secondary, because single-walled CNTs can increase tear strength with a smaller amount than multi-walled CNTs as well as has higher flexibility than multi-walled CNTs, it is presumed that a shaped article formed using single-walled CNTs can maintain flexibility.

The amount of the fibrous carbon nanostructures in the fluorinated elastomer composition needs to be 0.1 parts by mass or more per 100 parts by mass of the fluorinated elastomer, preferably 0.2 parts by mass or more, more preferably 0.3 parts by mass or more, and even more preferably 0.4 parts by mass or more. When the amount of the fibrous carbon nanostructures is less than 0.1 parts by mass per 100 parts by mass of the fluorinated elastomer, it is not possible to ensure strength of a shaped article formed using the fluorinated elastomer composition, resulting in failure to sufficiently increase flexibility as well as high-temperature tensile energy to break and high-temperature tear strength.

Further, the amount of the fibrous carbon nanostructures in the fluorinated elastomer composition needs to be less than 5 parts by mass per 100 parts by mass of the fluorinated elastomer, preferably 4.5 parts by mass or less, more preferably 4 parts by mass or less, and even more preferably 3.5 parts by mass or less. When the amount of the fibrous carbon nanostructures is 5 parts by mass or more per 100 parts by mass of the fluorinated elastomer, it is not possible to maintain moderate flexibility.

The fibrous carbon nanostructures including single-walled CNTs can be any fibrous carbon nanostructures so long as single-walled CNTs are included. The fibrous carbon nanostructures including single-walled CNTs may be those consisting only of single-walled CNTs, a mixture of single-walled CNTs and multi-walled CNTs, or a mixture of CNTs including at least single-walled CNTs and fibrous carbon nanostructures other than CNTs.

From the viewpoint of improving flexibility as well as high-temperature tensile energy to break and high-temperature tear strength of a shaped article formed using the fluorinated elastomer composition, it is preferred that the number of single-walled CNTs per 100 fibrous carbon nanostructures is 50 or more, more preferably 70 or more, and even more preferably 90 or more.

It is also preferred that the fibrous carbon nanostructures including single-walled CNTs exhibit a convex upward shape in a t-plot obtained from an adsorption isotherm. The use of fibrous carbon nanostructures exhibiting a convex upward shape in a t-plot obtained from an adsorption isotherm makes it possible to form a shaped article having further increased flexibility.

It is preferred that the fibrous carbon nanostructures including single-walled CNTs have not undergone CNT opening treatment and exhibit a convex upward shape in a t-plot. Each carbon nanotube has an open end and a closed end.

Adsorption generally refers to a phenomenon in which gas molecules are taken away from the gas phase to a solid surface, and is classified as physical or chemical adsorption depending on the cause of adsorption. The nitrogen gas adsorption method used to acquire a t-plot utilizes physical adsorption. In general, when adsorption temperature is constant, the number of nitrogen gas molecules adsorbed to fibrous carbon nanostructures increases with increasing pressure. A plot of the adsorbed amount of nitrogen versus relative pressure (ratio of pressure P at adsorption equilibrium to saturated vapor pressure P0) refers to an "isotherm." An isotherm obtained when the adsorbed amount of nitrogen gas is measured while increasing pressure refers to an "adsorption isotherm" and an isotherm obtained when the adsorbed amount of nitrogen gas is measured while decreasing pressure refers to a "desorption isotherm."

A t-plot is obtained by converting relative pressure to average adsorbed nitrogen gas layer thickness t (nm) in an adsorption isotherm measured by the nitrogen gas adsorption method. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

The growth of an adsorbed layer of nitrogen gas for a sample having pores at the surface is divided into the following processes (1) to (3). The gradient of the t-plot changes according to following processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

It is preferred that the t-plot for the fibrous carbon nanostructures including single-walled CNTs shows a straight line crossing the origin in a region in which the average adsorbed nitrogen gas layer thickness t is small and deviates downward from the straight line as t increases to have a convex upward shape. Such a t-plot shape indicates that the ratio of internal specific surface area to total specific surface area of the fibrous carbon nanostructures is large, indicating the presence of a large number of openings formed in the carbon nanostructures that constitute the fibrous carbon nanostructures. It is presumed that this further increases the flexibility of a shaped article formed using a fluorinated elastomer composition which comprises such fibrous carbon nanostructures.

It is preferred that the t-plot for the fibrous carbon nanostructures including single-walled CNTs has a bending point in a range of $0.2 \leq t$ (nm)$\leq 1.5$, more preferably in a range of $0.45 \leq t$ (nm)$\leq 1.5$, and even more preferably in a range of $0.55 \leq t$ (nm)$\leq 1.0$. When the position of the bending point of the t-plot falls within the range described above, it is possible to further increase high-temperature tensile energy to break and high-temperature tear strength as the characteristics of the fibrous carbon nanostructures further improve.

The "position of the bending point" is an intersection point of an approximate straight line A for process (1) and an approximate straight line B for process (3) in the t-plot.

It is further preferred that the fibrous carbon nanostructures including single-walled CNTs have a ratio of internal specific surface area S2 to total specific surface area S1 (S2/S1), obtained from a t-plot, of 0.05 or more, more preferably 0.06 or more, even more preferably 0.08 or more, but preferably 0.30 or less. When the value of S2/S1 is 0.05 or more and 0.30 or less, it is possible to further increase high-temperature tensile energy to break and high-temperature tear strength as the characteristics of the fibrous carbon nanostructures further improve.

The fibrous carbon nanostructures including single-walled CNTs can have any total specific surface area S1 and any internal specific surface area S2. However, S1 is preferably 600 $m^2/g$ or more and 1,400 $m^2/g$ or less, and more preferably 800 $m^2/g$ or more and 1,200 $m^2/g$ or less. On the other hand, S2 is preferably 30 $m^2/g$ or more and 540 $m^2/g$ or less.

Total specific surface area S1 and internal specific surface area S2 of the fibrous carbon nanostructures including single-walled CNTs can be found from the t-plot. Specifically, first, total specific surface area S1 can be found from the gradient of an approximate straight line corresponding to process (1) and external specific surface area S3 can be found from the gradient of an approximate straight line corresponding to process (3). Internal specific surface area S2 can then be calculated by subtracting external specific surface area S3 from total specific surface area S1.

Measurement of adsorption isotherm, preparation of a t-plot, and calculation of total specific surface area S1 and internal specific surface area S2 based on t-plot analysis for fibrous carbon nanostructures including single-walled CNTs can be made using for example BELSORP®-mini (BELSORP is a registered trademark in Japan, other countries, or both), a commercially available measurement instrument available from Bel Japan Inc.

The fibrous carbon nanostructures including single-walled CNTs are preferably those having a ratio of a standard deviation (σ) of diameters multiplied by 3 (3σ) to average diameter (Av) (3σ/Av) of greater than 0.20 and less than 0.60, more preferably those having 3σ/Av of greater than 0.25, and even more preferably those having 3σ/Av of greater than 0.40. The use of fibrous carbon nanostructures including single-walled CNTs having 3σ/Av of greater than 0.20 and less than 0.60 makes it possible to form a shaped article which shows both further increased flexibility and further increased high-temperature tensile energy to break and high-temperature tear strength.

"Average diameter (Av) of fibrous carbon nanostructures" and "standard deviation (σ) (where σ is sample standard deviation) of diameters of fibrous carbon nanostructures" can each be obtained by measuring the diameters (outer diameters) of 100 fibrous carbon nanostructures randomly selected by transmission electron microscopy. The average diameter (Av) and standard deviation (σ) of the fibrous carbon nanostructures including single-walled CNTs may be adjusted either by changing the production method and/or the production conditions of the fibrous carbon nanostructures or by combining different types of fibrous carbon nanostructures prepared by different production methods.

In a Raman spectrum of the fibrous carbon nanostructures including single-walled CNTs, the ratio of G band peak intensity to D band peak intensity (G/D ratio) is preferably 1 or more and 20 or less. When the G/D ratio is 1 or more and 20 or less, it is possible to form a shaped article which shows both further increased flexibility and further increased high-temperature tensile energy to break and high-temperature tear strength.

The fibrous carbon nanostructures including single-walled CNTs preferably have an average diameter (Av) of 2 nm or more, more preferably 2.5 nm or more, but preferably 10 nm or less, more preferably 6 nm or less. When the average diameter (Av) of the fibrous carbon nanostructures is 2 nm or more, it is possible to form a shaped article which shows further increased high-temperature tensile energy to break and high-temperature tear strength. When the average diameter (Av) of the fibrous carbon nanostructures is 10 nm or less, it is possible to form a shaped article having further increased flexibility.

The fibrous carbon nanostructures including single-walled CNTs preferably have an average length at the time of synthesis of 100 μm or more. Fibrous carbon nanostructures having a longer length at the time of synthesis are more susceptible to damage such as breaking, severing or the like during dispersing. Therefore, the average length of the nanostructures at the time of synthesis is preferably 5,000 μm or less.

The fibrous carbon nanostructures including single-walled CNTs preferably have an aspect ratio (length/diameter) of greater than 10. The aspect ratio of the fibrous carbon nanostructures can be found by measuring diameters and lengths of 100 fibrous carbon nanostructures randomly selected by transmission electron microscopy and calculating the average of ratios of length to diameter (length/diameter).

The fibrous carbon nanostructures including single-walled CNTs preferably have a BET specific surface area of 600 $m^2/g$ or more, more preferably 800 $m^2/g$ or more, but preferably 2,500 $m^2/g$ or less, more preferably 1,200 $m^2/g$ or less. When the BET specific surface area of the fibrous carbon nanostructures including single-walled CNTs is 600 $m^2/g$ or more, it is possible to further increase high-temperature tensile energy to break and high-temperature tear strength as the strength of the formed shaped article can be increased. When the BET specific surface area of the fibrous carbon nanostructures including single-walled CNTs is 2,500 $m^2/g$ or less, it is possible to allow the formed shaped article to have a suitable hardness while maintaining its flexibility.

The term "BET specific surface area" as used herein refers to a nitrogen adsorption specific surface area measured by the BET method.

In accordance with the super growth method described later, the fibrous carbon nanostructures including single-walled CNTs are obtained, on a substrate having thereon a catalyst layer for carbon nanotube growth, in the form of an aggregate wherein fibrous carbon nanostructures are aligned substantially perpendicularly to the substrate (aligned aggregate). The mass density of the fibrous carbon nanostructures in the form of such an aggregate is preferably 0.002 $g/cm^3$ or more and 0.2 $g/cm^3$ or less. A mass density of 0.2 $g/cm^3$ or less allows the fibrous carbon nanostructures to be homogeneously dispersed within the fluorinated elastomer because binding among the fibrous carbon nanostructures is weakened. A mass density of 0.002 $g/cm^3$ or more improves the unity of the fibrous carbon nanostructures thus preventing the fibrous carbon nanostructures from becoming unbound and making the fibrous carbon nanostructures easier to handle.

The fibrous carbon nanostructures including single-walled CNTs preferably include micropores. Preferred fibrous carbon nanostructures are those having micropores with a pore diameter of smaller than 2 nm and the abundance thereof as measured in terms of micropore volume determined by the method described below is preferably 0.40 mL/g or more, more preferably 0.43 mL/g or more, even more preferably 0.45 mL/g or more, with the upper limit being generally on the order of 0.65 mL/g. The presence of such micropores in the fibrous carbon nanostructures including single-walled CNTs can further increase flexibility. Micropore volume can be adjusted for example by appropriately changing the preparation method and preparation conditions of the fibrous carbon nanostructures.

"Micropore volume (Vp)" can be calculated using Equation (I): $Vp=(V/22414)\times(M/\rho)$ by measuring a nitrogen adsorption isotherm of the fibrous carbon nanostructures including single-walled CNTs at liquid nitrogen temperature (77 K) with the amount of adsorbed nitrogen at a relative pressure P/P0 of 0.19 defined as V, where P is a measured pressure at adsorption equilibrium, and P0 is a saturated vapor pressure of liquid nitrogen at time of measurement. In Equation (I), M is a molecular weight of 28.010 of the adsorbate (nitrogen), and ρ is a density of 0.808 $g/cm^3$ of the adsorbate (nitrogen) at 77 K. Micropore volume can be measured for example using "BELSORP®-mini" produced by Bel Japan Inc.

The fibrous carbon nanostructures including single-walled CNTs having the properties described above can be efficiently produced for example by forming a catalyst layer on a substrate surface by wet process in the super growth method (see WO2006/011655) wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes obtained by the super growth method may also be referred to as "SGCNTs."

The fibrous carbon nanostructures including single-walled CNTs produced by the super growth method may be composed solely of SGCNTs or may be composed of SGCNTs and non-cylindrical carbon nanostructures. Specifically, the fibrous carbon nanostructures including single-walled CNTs may include single- or multi-walled flattened cylindrical carbon nanostructures having over the entire length a tape portion where inner walls are in close proximity to each other or bonded together (hereinafter such carbon nanostructures may be also referred to as "graphene nanotapes (GNTs)").

GNT is presumed to be a substance having over the entire length a tape portion where inner walls are in close proximity to each other or bonded together since it has been synthesized, and having a network of 6-membered carbon rings in the form of flattened cylindrical shape. The GNT's flattened cylindrical structure and the presence of a tape portion where inner walls are in close proximity to each other or bonded together in the GNT can be confirmed for example as follows: GNT and fullerene (C60) are sealed into a quartz tube and subjected to heat treatment under reduced pressure (fullerene insertion treatment) to form a fullerene-inserted GNT, followed by observation under transmission electron microscopy (TEM) of the fullerene-inserted GNT to confirm the presence of part in the GNT where no fullerene is inserted (tape portion).

The shape of the GNT is preferably such that it has a tape portion at the central part in the width direction. More preferably, the shape of a cross-section of the GNT, perpendicular to the extending direction (axial direction), is such that the maximum dimension in a direction perpendicular to the longitudinal direction of the cross section is larger in the vicinity of opposite ends in the longitudinal direction of the cross section than in the vicinity of the central part in the longitudinal direction of the cross section. Most preferably, a cross-section of the GNT perpendicular to the extending direction (axial direction) has a dumbbell shape.

The term "vicinity of the central part in the longitudinal direction of a cross section" used for the shape of a cross section of GNT refers to a region within 30% of longitudinal dimension of the cross section from the line at the longitudinal center of the cross section (i.e., a line that passes through the longitudinal center of the cross section and is perpendicular to the longitudinal line in the cross section). The term "vicinity of opposite ends in the longitudinal direction of a cross section" refers to regions outside the "vicinity of the central part in the longitudinal direction of a cross section" in the longitudinal direction.

Carbon nanostructures including GNTs as non-cylindrical carbon nanostructures can be obtained by, when synthesizing CNTs by the super growth method using a substrate having thereon a catalyst layer (hereinafter occasionally referred to as a "catalyst substrate"), forming the catalyst substrate using a specific method. Specifically, carbon nanostructures including GNTs can be obtained by the super growth method using a catalyst substrate prepared as follows: coating liquid A containing an aluminum compound is applied on a substrate and dried to form an aluminum thin film (catalyst support layer) on the substrate, followed by application of coating liquid B containing an iron compound on the aluminum thin film and drying of the coating liquid B at a temperature of 50° C. or below to form an iron thin film (catalyst layer) on the aluminum thin film.

<Additives>

Additives which may be optionally blended in the fluorinated elastomer composition can be those known in the art, such as cross-linking agents, cross-linking aids, co-cross-linking agents, reinforcing materials, lubricants, anti-aging agents, and coupling agents.

Specifically, cross-linking agents known in the art can be used which are able to crosslink the fluorinated elastomer contained in the fluorinated elastomer composition. More specifically, peroxide-based cross-linking agents, polyol-based cross-linking agents, or polyamine-based cross-linking agents can be used, for example.

Any cross-linking acid can be used and zinc oxide can be used, for example.

Any co-cross-linking agent can be used and triallyl isocyanurate can be used, for example.

Any reinforcing material can be used and carbon black and silica can be used, for example.

Any lubricant can be used and sodium stearate can be used, for example.

Any anti-aging agent can be used and examples include di-t-butyl-P-cresol, pentaerythrityl-tetrakis[3-(3,5-di-t-butyl-4-hydroxyphenyl)propionate], 2,2'-methylenebis(2-methyl-6-t-butylphenyl), bis(2,2,6,6-tetramethyl-4-piperazyl)sebacate, N,N'-hexane-1,6-diylbis[3-(3,5-di-tert-butyl-4-hydroxyphenyl)propionamide], and bis(2,2,6,6-tetramethyl-4-piperazyl)sebacate.

Any coupling agent can be used and examples include γ-chloropropyltrimethoxysilane, vinyltriethoxysilane, vinyltris-(β-methoxyethoxy)silane, γ-methacryloxypropyltrimethoxysilane, β-(3,4-ethoxycyclohexyl) ethyltrimethoxysilane, γ-glycidoxypropyltrimethoxysilane, γ-mercaptopropyltrimethoxysilane, γ-aminopropyltrimethoxysilane, and N-β-(aminoethyl)-γ-aminopropyltrimethoxysilane.

These additives may be used alone or in combination of two or more. Any amount of the additive can be added so long as the desired effect is not compromised.

<Preparation of Fluorinated Elastomer Composition>

The fluorinated elastomer composition can be produced for example by mixing or kneading desired proportions of the fluorinated elastomer, the fibrous carbon nanostructures including single-walled carbon nanotubes, and an additive as an optional component.

Specifically, the fluorinated elastomer composition can be prepared by any method by obtaining a mixture of the fluorinated elastomer and the fibrous carbon nanostructures including single-walled carbon nanotubes, and then kneading the resulting mixture with an additive as an optional component.

Preparation of the mixture of the fluorinated elastomer and the fibrous carbon nanostructures including single-walled carbon nanotubes can be effected by any mixing method capable of dispersing in the fluorinated elastomer the fibrous carbon nanostructures including single-walled carbon nanotubes. Specifically, the mixture can be prepared by any method by adding the fibrous carbon nanostructures including single-walled carbon nanotubes in a fluorinated elastomer solution which is obtained by dissolving the fluorinated elastomer into an organic solvent or in a fluorinated elastomer dispersion which is obtained by dispersing the fluorinated elastomer into a dispersion medium; dispersing the fibrous carbon nanostructures including the single-walled CNTs; and removing the organic solvent or dispersion medium from the resulting dispersed solution.

The dispersing treatment can be carried out by dispersing methods known in the art. Examples of dispersing devices include, but not particularly limited to, ultrasonic homogenizers, wet jet mills, and high-speed rotary shearing dispersers, with wet jet mills being preferred because a moderately strong shearing force can be applied to sufficiently disperse the fibrous carbon nanostructures to form a shaped article with improved material homogeneity. The pressure applied during the dispersing treatment of the mixture by wet jet mill may be 10 to 180 MPa, preferably 15 to 170 MPa, more preferably 20 to 160 MPa, and even more preferably 20 to 150 MPa. The number of dispersing treatment (number of passes) is 1 or more, preferably 2 to 20. The dispersion treatment temperature is preferably 0° C. to 80° C. Examples of wet jet mills usable for the dispersing treatment include "NanoVater®" (NanoVater is a registered trademark in Japan, other countries, or both) (manufactured by Yoshida Kikai Co., Ltd.), "BERYU SYSTEM PRO" (manufactured by Beryu Corporation), ultrahigh-pressure wet atomizer (Yoshida Works Pro), "Nanomizer®" (Nanomizer is a registered trademark in Japan, other countries, or both) (manufactured by Nanomizer, Inc.), and "StarBurst®" (StarBurst is a registered trademark in Japan, other countries, or both) (manufactured by Sugino Machine Ltd.). From the viewpoint of limiting clogging, the minimum flow path diameter of the wet jet mill is preferably 100 μm or more, and from the viewpoint of achieving effective dispersing under pressure, the minimum flow path diameter is preferably 1,000 μm or less.

The mixture can be prepared by removing the organic solvent or dispersion medium from the resulting dispersed solution. Removal of organic solvent or dispersion medium can be carried by coagulation, casting or drying.

Kneading of the mixture with additives can be carried out for example using a mixer, a single screw kneader, a twin screw kneader, a roll, Brabender® (Brabender is a registered trademark in Japan, other countries, or both), or an extruder.

(Shaped Article)

The shaped article of the present disclosure can be obtained by shaping the fluorinated elastomer composition into a desired form. Specifically, the shaped article can be formed for example by placing the fluorinated elastomer composition into a mold and optionally cross-linking the composition. The shaped article formed using the fluorinated elastomer composition comprises components derived from the components contained in the fluorinated elastomer composition in proportions similar to those in the composition. That is, when the fluorinated elastomer composition comprises a cross-linking agent, for example, the shaped article then comprises specific proportions of a cross-linked elastomer and fibrous carbon nanostructures including single-walled CNTs, and optionally further comprises an additive such as an anti-aging agent.

The shaped article can be a sealing member, for example. The sealing member may be of any shape according to the intended application and may have an annular (O-ring) or hollow disc shape.

The shaped article can have sufficiently increased tear strength both at normal and high temperatures as well as moderate hardness.

When the shaped article is formed of a cross-linked product obtained by cross-linking the fluorinated elastomer composition, the cross-linked product preferably has physical properties described below.

That is, the cross-linked product needs to have a tensile energy to break at high temperature (e.g., 200° C.) of 1.2 MJ/m$^3$ or more, preferably 1.3 MJ/m$^3$ or more, more preferably 1.4 MJ/m$^3$ more, and particularly preferably 1.5 MJ/m$^3$ or more. The cross-linked product can have a tensile energy to break at high temperature (e.g., 200° C.) of 15 MJ/m$^3$ or less.

The cross-linked product also needs to have a tear strength at high temperature (e.g., 200° C.) of 3 N/mm or more, preferably 3.5 N/mm or more, more preferably 4 N/mm or more, and particularly preferably 4.5 N/mm or more. The cross-linked product can have a tear strength at high temperature (e.g., 200° C.) of 20 N/mm or less.

Further, the cross-linked product needs to have a durometer hardness of 45 to 90, preferably 50 to 90, more preferably 55 to 90, and particularly preferably 60 to 90.

The "tensile energy to break" of the cross-linked product can be measured in accordance with JIS K 6251. The "tear strength" of the cross-linked product can be measured in accordance with JIS K 6252. The "durometer hardness" of the cross-linked product can be measured with a type A durometer in accordance with JIS K 6253.

EXAMPLES

The following provides a more specific description of the present disclosure based on Examples, which however shall not be construed as limiting. In the following description, "%" and "parts" used to express quantities are by mass, unless otherwise specified.

In Examples and Comparative Examples, the tensile energy to break, tear strength and durometer hardness of each cross-linked product were measured or evaluated by the methods described below.

<Tensile Energy to Break>

The prepared sheet-like crosslinked product was punched out in a dumbbell shape No. 3 to provide a test piece. In accordance with JIS K 6251, the test piece was subjected to a tensile test at 200° C. until it breaks, and the breaking energy (unit: MJ/m$^3$) was obtained from the area of a stress-strain curve. Higher tensile energy to break at 200° C. indicates better high-temperature tensile strength.

<Tear Strength>

The prepared sheet-like crosslinked product was punched out in an unnicked angle shape to provide a test piece. In accordance with JIS K 6252, the test piece was measured for tear strength at 200° C. Tear strength at 200° C. of 3 to 20 N/mm indicates superior high-temperature tear strength.

<Durometer Hardness>

The prepared sheet-like cross-linked product was punched out in a dumbbell shape No. 3 to provide a test piece. In accordance with JIS K 6253, the test piece was measured for durometer hardness at a temperature of 23° C. using a type A durometer. Durometer hardness of 45 to 90 indicates superior flexibility and moderate hardness.

Example 1

<Preparation of Fibrous Carbon Nanostructures Including Single-Walled Carbon Nanotubes>

In accordance with the teaching of WO2006/011655A, the super growth method was used to prepare carbon nanotubes (SGCNTs) as the fibrous carbon nanostructures. Upon preparation of SGCNTs, formation of a catalyst layer on a substrate surface was carried out by the wet process and a source gas containing acetylene as a main component was used.

The obtained SGCNTs consisted primarily of single-walled CNTs, with the radial breathing mode (RBM) being observed in a low wavenumber range of 100 to 300 cm$^{-1}$ in a spectrum measured by a Raman spectrophotometer, which is characteristic of single-walled CNTs. The BET specific surface area of the SGCNTs as measured using a BET specific surface area meter ("BELSORP-max" manufactured by Bel Japan Inc.) was 1,050 m$^2$/g (unopened). The diameters and lengths of 100 SGCNTs randomly selected using a transmission electron microscope were measured to find the average diameter (Av), the standard deviation (σ) of the diameters and the average length for the SGCNTs. The average diameter (Av) was 3.3 nm, the standard deviation (σ) multiplied by 3 (3σ) was 1.9 nm, the ratio of 3σ to Av (3σ/Av) was 0.58, and the average length was 500 μm. A t-plot of the SGCNTs measured using "BELSORP-mini" manufactured by Bel Japan Inc. was bent having a convex upward shape. The value of S2/S1 was 0.09 and the position t of the bending point was 0.6 nm.

<Preparation of Fluorinated Elastomer Composition>
[Preparation of Mixture]

100.0 parts by mass (200 g) of FKM (Viton GBL-200S, manufactured by DuPont Elastomer Co., Ltd.) as a fluorinated elastomer was added to 4,000 g of methyl ethyl ketone as an organic solvent and stirred for 12 hours to dissolve the fluorinated elastomer. The Mooney viscosity (ML$_{1+10}$, 121° C.) of the fluorinated elastomer as measured in accordance with JIS K 6300 was 25.

Next, 4.5 parts by mass (9 g) of the SGCNTs was added to the obtained fluorinated elastomer solution and the mixture was stirred for 15 minutes using a stirrer (LABOLUTION® (LABOLUTION is a registered trademark in Japan, other countries, or both) manufactured by PRIMIX Corporation). Further, using a wet jet mill (L-ES007, manufactured by Yoshida Kikai Co., Ltd.), the solution containing SGCNTs was subjected to dispersing treatment at 100 MPa. The dispersed solution was then added dropwise to 16 kg of water for solidification to afford a black solid. The black solid was dried under reduced pressure at 80° C. for 12 hours to afford a mixture of fluorinated elastomer and SGCNTs.

[Kneading]

Subsequently, the mixture of fluorinated elastomer and SGCNTs; 3.0 parts by mass (6 g) of zinc oxide as a cross-linking aid; 3.0 parts by mass (6 g) of triallyl isocyanurate ("TAIC®" (TAIC is a registered trademark in Japan, other countries, or both) manufactured by Nihon Kasei Co., Ltd.) as a co-cross-linking agent; and 2.0 parts by mass (4 g) of 2,5-dimethyl-2,5-di(t-butylperoxy)hexane ("PERHEXA® 25B40" (PERHEXA is a registered trademark in Japan, other countries, or both) manufactured by NOR Corporation) as a cross-linking agent were kneaded using a 15° C. open roll to afford a fluorinated elastomer composition.

<Preparation of Sheet-Like Cross-Linked Product>

The obtained fluorinated elastomer composition was placed into a mold and cross-linked at a temperature of 170° C. and a pressure of 10 MPa for 20 minutes to afford a sheet-like cross-linked product (150 mm length, 150 mm width, 2 mm thick) as a shaped article. Next, the obtained cross-linked product was transferred to a gear type oven and subjected to secondary cross-linking at 230° C. for 2 hours.

The tensile energy to break, tear strength and durometer hardness of the cross-linked product were measured. The results are shown in Table 1.

Example 2

A fluorinated elastomer composition and a sheet-like cross-linked product as a shaped article were prepared as in Example 1 except that 10.0 parts by mass (20 g) of carbon black ("Thermax® N990" (Thermax is a registered trademark in Japan, other countries, or both) manufactured by Cancarb Limited) as a reinforcing material was added when kneading. The prepared cross-linked product was evaluated as in Example 1. The results are shown in Table 1.

Examples 3 to 4

<Preparation of Fluorinated Elastomer Composition>

Fluorinated elastomer compositions were prepared as in Example 1 except that when preparing the mixture 100.0 parts by mass (200 g) of FEPM ("AFLAS 100S" manufactured by Asahi Glass Co., Ltd.) was used as a fluorinated elastomer instead of FKM, 4,000 g of tetrahydrofuran was used as a dispersion medium, and the amount of SGCNTs was changed to 3.0 parts by mass (6 g in Example 3) or 2.0 parts by mass (4 g in Example 4), and the mixture of fluorinated elastomer and SGCNTs, 5.0 parts by mass (10 g) of triallyl isocyanurate ("TAIC" manufactured by Nihon Kasei Co., Ltd.) as a co-cross-linking agent, 1.0 part by mass (2 g) of 1,3-bis(t-butylperoxyisopropyl)benzene ("Vul Cup 40KE" manufactured by GEO Specialty Chemicals Inc.) as a cross-linking agent, and 1.0 part by mass (2 g) of sodium stearate as a lubricant were kneaded.

<Preparation of Sheet-Like Cross-Linked Product>

The obtained fluorinated elastomer compositions were each placed into a mold and cross-linked at a temperature of 170° C. and a pressure of 10 MPa for 20 minutes to afford a sheet-like cross-linked product (150 mm length, 150 mm width, 2 mm thick) as a shaped article. Next, the obtained cross-linked product was transferred to a gear type oven and subjected to secondary cross-linking at 200° C. for 4 hours.

The tensile energy to break, tear strength and durometer hardness of the cross-linked product were measured. The results are shown in Table 1.

Example 5

A fluorinated elastomer composition and a sheet-like cross-linked product as a shaped article were prepared as in Example 4 except that 10.0 parts by mass (20 g) of carbon black ("Thermax N990" manufactured by Cancarb Limited) as a reinforcing material was added when kneading. The prepared cross-linked product was evaluated as in Example 4. The results are shown in Table 1.

Comparative Example 1

A fluorinated elastomer composition and a sheet-like cross-linked product as a shaped article were prepared as in Example 1 except that the amount of SGCNTs added to the fluorinated elastomer when preparing the mixture was changed to 10.0 parts by mass (20 g). The prepared cross-linked product was evaluated as in Example 1. The results are shown in Table 1.

Comparative Example 2

A fluorinated elastomer composition and a sheet-like cross-linked product as a shaped article were prepared as in Example 1 except that when preparing the mixture an open roll was used instead of the wet jet mill, and 100.0 parts by mass (200 g) of FKM (Viton GBL-200S manufactured by DuPont Elastomer Co., Ltd.) as a fluorinated elastomer, 45.0 parts by mass (90 g) of carbon black ("Thermax N990" manufactured by Cancarb Limited) instead of SGCNTs, 3.0 parts by mass (6 g) of zinc oxide as a cross-linking aid, 3.0 parts by mass (6 g) of triallyl isocyanurate as a co-crosslinking agent, and 2.0 parts by mass (4 g) of 2,5-dimethyl-2,5-di(t-butylperoxy)hexane were kneaded. The prepared cross-linked product was evaluated as in Example 1. The results are shown in Table 1.

Comparative Example 3

A fluorinated elastomer composition and a sheet-like cross-linked product as a shaped article were prepared as in Comparative Example 2 except that when preparing the mixture 5.0 parts by mass (10 g) of MWCNTs ("Nanocyl NC 7000" manufactured by Nanocyl S.A.) was used instead of carbon black. The prepared cross-linked product was evaluated as in Example 1. The results are shown in Table 1.

Comparative Example 4

A fluorinated elastomer composition and a sheet-like cross-linked product as a shaped article were prepared as in Comparative Example 2 except that when preparing the mixture 100.0 parts by mass (200 g) of FEPM ("AFLAS 100S" manufactured by Asahi Glass Co., Ltd.) as a fluorinated elastomer instead of FKM, 30.0 parts by mass (60 g) of carbon black ("Thermax N990" manufactured by Cancarb Limited), 5.0 parts by mass (10 g) of triallyl isocyanurate ("TAIC" manufactured by Nihon Kasei Co., Ltd.) as a co-cross-linking agent, 1.0 part by mass (2 g) of 1,3-bis(t-butylperoxyisopropyl)benzene ("Vul Cup 40KE" manufactured by GEO Specialty Chemicals Inc.) as a cross-linking agent, and 1.0 part by mass (2 g) of sodium stearate as a lubricant were kneaded. The prepared cross-linked product was evaluated as in Example 1. The results are shown in Table 1.

In particular, it can be seen from the results of Examples 2 and 5 in Table 1 that further inclusion of carbon black may allow flexibility (hardness), tensile energy to break and tear strength of the shaped article to be increased in a well-balanced manner.

INDUSTRIAL APPLICABILITY

According to the present disclosure, it is possible to provide a fluorinated elastomer composition which can be used to form a shaped article which shows both sufficiently increased flexibility and sufficiently increased high-temperature tensile energy to break and high-temperature tear strength.

According to the present disclosure, it is also possible to provide a shaped article which shows both sufficiently increased flexibility and sufficiently increased high-temperature tensile energy to break and high-temperature tear strength.

The invention claimed is:

1. A sealing member formed using a fluorinated elastomer composition comprising a fluorinated elastomer, fibrous carbon nanostructures, and a carbon black,
   wherein the fibrous carbon nanostructures include single-walled carbon nanotubes,
   the fibrous carbon nanostructures are contained in an amount of 0.1 parts by mass or more and less than 5.0 parts by mass per 100 parts by mass of the fluorinated elastomer,
   the fibrous carbon nanostructures have not undergone an opening formation treatment of carbon nanotubes and exhibit a convex upward shape in a t-plot obtained from an adsorption isotherm, and
   each carbon nanotube has an open end and a closed end.

2. The sealing member according to claim 1, wherein the t-plot has a bending point in a range of $0.2 \leq t$ (nm)$\leq 1.5$.

3. The sealing member according to claim 1, wherein total specific surface area S1 and internal specific surface area S2, obtained from the t-plot, satisfy the condition $0.05 \leq S2/S1 \leq 0.30$.

TABLE 1

| | | | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| Fluorinated elastomer composition | Fluorinated elastomer | FKM: Viton GBL-200S [parts by mass] | 100.0 | 100.0 | — | — | — | 100.0 | 100.0 | 100.0 | — |
| | | FEPM: AFLAS 100S [parts by mass] | — | — | 100.0 | 100.0 | 100.0 | — | — | — | 100.0 |
| | Fibrous carbon nanostructures | SGCNTs [parts by mass] | 4.5 | 4.5 | 3.0 | 2.0 | 2.0 | 10.0 | — | — | — |
| | | MWCNTs: Nanocyl NC7000 [parts by mass] | — | — | — | — | — | — | — | 5.0 | — |
| | Carbon black | Thermax N990 [parts by mass] | — | 10.0 | — | — | 10.0 | — | 45.0 | — | 30.0 |
| | Additives | Zinc oxide [parts by mass] | 3.0 | 3.0 | — | — | — | 3.0 | 3.0 | 3.0 | — |
| | | TAIC [parts by mass] | 3.0 | 3.0 | 5.0 | 5.0 | 5.0 | 3.0 | 3.0 | 3.0 | 5.0 |
| | | Vul Cup 40KE [parts by mass] | — | — | 1.0 | 1.0 | 1.0 | — | — | — | 1.0 |
| | | Sodium stearate [parts by mass] | — | — | 1.0 | 1.0 | 1.0 | — | — | — | 1.0 |
| | | PERHEXA 25B40 [parts by mass] | 2.0 | 2.0 | — | — | — | 2.0 | 2.0 | 2.0 | — |
| Evaluation | | Tensile energy to break @200° C. [MJ/m$^3$] | 2.9 | 3.2 | 2.0 | 1.5 | 2.1 | 2.1 | 0.7 | 0.5 | 0.6 |
| | | Tear strength @200° C. [N/mm] | 13.5 | 14.1 | 7.0 | 5.1 | 5.4 | 15.1 | 4.6 | 7.7 | 2.5 |
| | | Durometer hardness [—] | 88 | 89 | 89 | 82 | 84 | 93 | 81 | 80 | 75 |

It can be seen from Table 1 that Examples 1 to 5 which used specific proportions of fibrous carbon nanostructures including single-walled CNTs provided shaped articles having all of superior flexibility (i.e., moderate hardness), superior high-temperature tensile energy to break and superior high-temperature tear strength compared to Comparative Example 1 which did not use the claimed proportion of fibrous carbon nanostructures including single-walled CNTs and to Comparative Examples 2 to 4 which did not use fibrous carbon nanostructures including single-walled CNTs.

4. The sealing member according to claim 1, wherein the fibrous carbon nanostructures have an average diameter of 2 nm or more and 10 nm or less.

5. The sealing member according to claim 1, wherein the fluorinated elastomer composition further comprises a cross-linking agent.

6. The sealing member according to claim 1, wherein the sealing member is a packing, a gasket, or an O-ring.

* * * * *